(12) United States Patent
Shiozawa

(10) Patent No.: US 7,405,748 B2
(45) Date of Patent: Jul. 29, 2008

(54) VIDEO SIGNAL MONITORING APPARATUS

(75) Inventor: Masahiro Shiozawa, Kanagawa (JP)

(73) Assignee: Leader Electronics Corporation, Yokohama-shi, Kanagawa-ken (JP)

( * ) Notice: Subject to any disclaimer, the term of this patent is extended or adjusted under 35 U.S.C. 154(b) by 1084 days.

(21) Appl. No.: 10/777,146

(22) Filed: Feb. 13, 2004

(65) Prior Publication Data
US 2004/0165067 A1    Aug. 26, 2004

(30) Foreign Application Priority Data
Feb. 24, 2003    (JP)    ............... 2003-045900

(51) Int. Cl.
*H04N 17/02* (2006.01)
*G09G 5/02* (2006.01)

(52) U.S. Cl. ............... 348/185; 348/184; 345/590

(58) Field of Classification Search .......... 348/184, 348/185, 186, 180, 659, 660, 649, 708, 651, 348/645, 646; 345/589–591, 603, 604
See application file for complete search history.

(56) References Cited

U.S. PATENT DOCUMENTS

| | | | | |
|---|---|---|---|---|
| 4,707,727 A | | 11/1987 | Penney | |
| 5,311,295 A | * | 5/1994 | Tallman et al. | 348/180 |
| 5,519,440 A | * | 5/1996 | Baker | 348/186 |
| 6,828,981 B2 | * | 12/2004 | Richardson | 345/590 |
| 7,071,965 B2 | * | 7/2006 | Baker | 348/186 |
| 2004/0165067 A1 | * | 8/2004 | Shiozawa | 348/184 |
| 2007/0091213 A1 | * | 4/2007 | Jaspers | 348/687 |

FOREIGN PATENT DOCUMENTS

JP    4-77518    8/1992

* cited by examiner

*Primary Examiner*—M. Lee
(74) *Attorney, Agent, or Firm*—Fish & Richardson P.C.

(57) ABSTRACT

An apparatus for monitoring a video signal comprises means for detecting a gamut error in an R component, means for detecting a gamut error in a G component, and means for detecting a gamut error in a B component. The means for detecting a gamut error in the R component includes: means for generating a first condition $Y>S-a\times Pr$ (where a is a predetermined coefficient) and a second condition $Y<T-a\times Pr$ from a Pr component of a Y/color difference component signal and an upper limit value S and a lower limit value T of the RGB component signal. The apparatus further comprises means for making a gamut error state visually recognizable with respect to the R component when the first condition or the second condition is satisfied.

2 Claims, 5 Drawing Sheets

VIDEO SIGNAL MONITORING APPARATUS

BACKGROUND OF THE INVENTION

The present invention relates to a video signal monitoring apparatus and, more particularly, to an apparatus for monitoring a Y/color difference component signal.

Video signals are prescribed in various formats, e.g., the RGB component signal format, the Y/color difference component signal format and the NTSC composite signal format. In conventional video systems, the input-side video signal format (RGB component signal) is the same as the output-side video signal format (RGB component signal). More specifically, in a conventional video system, an RGB component signal is input from an input device (e.g., a camera) and is converted into a Y/color difference component signal to be transmitted. Thereafter, in the video system, the Y/color difference component signal is again converted into an RGB component signal, which is output through an output device (e.g., a television set). The RGB component signal on the output side (display side) is theoretically the same as that on the input side and has no abnormal value, as long as no problem occurs with the transmission system and devices constituting the video system.

In some cases, as a result of the recent development of computer graphic apparatuses, an input device handling a Y/color difference component-signal (e.g., a computer) is used instead of an input device handling an RGB component signal (e.g., a camera). Also, with the development of editing devices in recent years, it has become possible to adjust a Y/color difference component signal according to one's intention by using an editing device in a transmission stage.

FIG. 1 shows the gamut of an RGB component signal and the gamut of a Y/color difference component signal. As shown in FIG. 1, the gamut of a Y/color difference component signal is wider than that of an RGB component signal. Therefore, in a case where a Y/color difference component signal is used as an input-side video signal format or in a case where the level of a Y/color difference component signal is adjusted according to one's intention in a transmission stage, an RGB component signal on the output side (display side) may have an abnormal value not existing in the gamut on the output side. In such a case, therefore, there is a need to monitor whether or not the RGB component signal on the output side (display side) has an abnormal value.

A method of monitoring an RGB component signal on the output side (display side), e.g., one described in patent document 1 shown below is known.

(Patent Document 1)

Japanese Patent Publication No. 4-77518 (FIG. 1)

In the method described in patent document 1, a Y/color difference component signal is converted into an RGB component signal and determination is made as to whether or not any converted RGB value exists in the gamut on the output side as a normal value. This method enables checking of a gamut error in the converted RGB component signal but has a problem in that it is difficult to grasp how a gamut error is caused from the original Y/color difference component signal. In a case where a gamut error in the RGB component signal is detected, it is difficult for an operator to grasp how to adjust the ordinal Y/color difference component signal in order to correct the gamut error.

SUMMARY OF THE INVENTION

Therefore, an object of the present invention is to monitor a gamut error in a Y/color difference component signal before a conversion into an RGB component signal.

Another object of the present invention is to grasp how a gamut error is caused from an original Y/color difference component signal.

Still another object of the present invention is to provide a video signal monitoring apparatus which enables an operator to easily understand how to adjust an original Y/color difference component signal.

To achieve the above-described object, according to the present invention, an apparatus is provided for monitoring a video signal, the apparatus having means for inputting a Y/color difference component signal (Y, Pr, Pb); means for setting upper limit values S and lower limit values T corresponding to all components of an RGB component signal (R, G, B); means for determination as to the existence of a gamut error, the determination means making determination as to whether at least one of a first condition $Y > S + \alpha \times Pb + \beta \times Pr$ (where each of $\alpha$ and $\beta$ is a predetermined coefficient) indicating that at least one of R, G and B components is larger than the upper limit value S and a second condition $Y < T + \gamma \times Pb + \delta \times Pr$ (where each of $\gamma$ and $\delta$ is a predetermined coefficient) indicating that at least one of the R, G and B components is smaller than the lower limit value T is satisfied; and means for making a gamut error state visually recognizable when the first condition or the second condition is satisfied.

More specifically, a video signal monitoring apparatus in accordance with the present invention has means for detecting a gamut error in an R component, means for detecting a gamut error in a G component, and means for detecting a gamut error in a B component, the means for detecting a gamut error in the R component including means for generating a first condition $Y > S - a \times Pr$ (where a is a predetermined coefficient) and a second condition $Y < T - a \times Pr$ from a Pr component (first color difference component) of a Y/color difference component signal and an upper limit value S and a lower limit value T of the RGB component signal, and means for making a gamut error state visually recognizable with respect to the R component when the first condition or the second condition is satisfied, the means for detecting a gamut error in the G component including means for generating a third condition $Y > S + b \times Pb + c \times Pr$ (where each of b and c is a predetermined coefficient) and a fourth condition $Y < T + b \times Pb + c \times Pr$ from the Pr component and a Pb component (second color difference component) of the Y/color difference component signal and the upper limit value S and the lower limit value T of the RGB component signal, and means for making a gamut error state visually recognizable with respect to the G component when the third condition or the fourth condition is satisfied, the means for detecting a gamut error in the B component including means for generating a fifth condition $Y > S - d \times Pr$ (where d is a predetermined coefficient) and a sixth condition $Y < T - d \times Pr$ from the Pb component of the Y/color difference component signal and the upper limit value S and the lower limit value T of the RGB component signal, and means for making a gamut error state visually recognizable with respect to the B component when the fifth condition or the sixth condition is satisfied.

Figure 1:
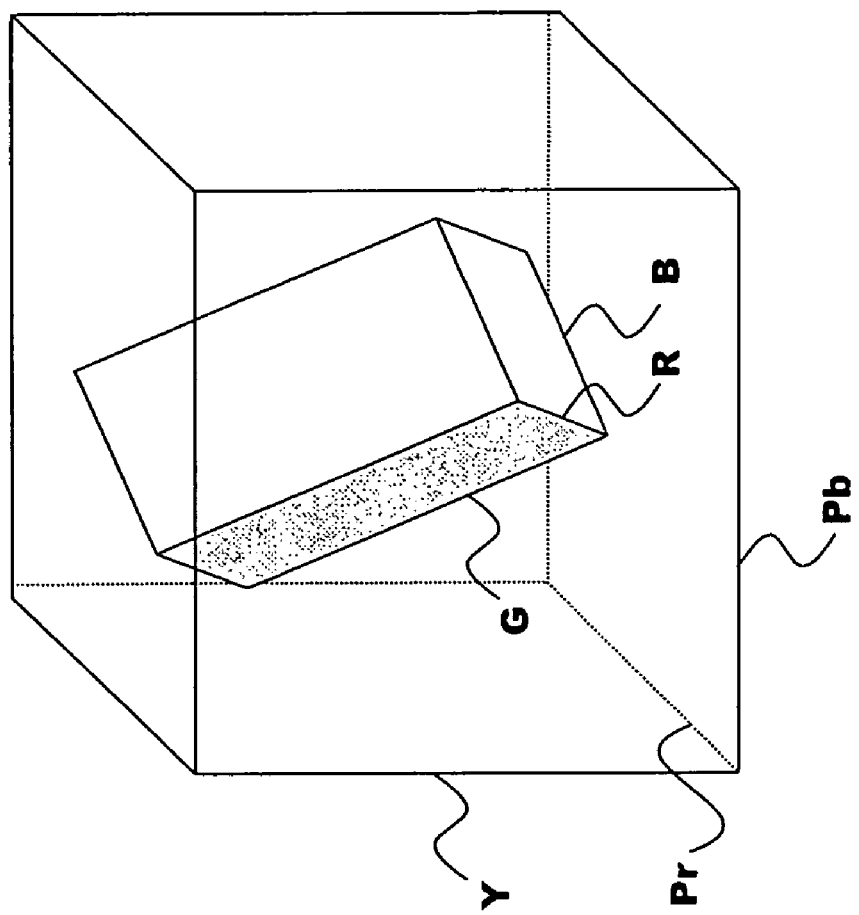
FIG. 1 is a diagram showing the gamut of an RGB component signal and the gamut of a Y/color difference component signal.

DETAILED DESCRIPTION OF THE PREFERRED EMBODIMENTS (Principle of Invention)

The principle of the present invention will first be described. Description will be made of a video signal for use in a high definition-television (HDTV) system. However, the principle described below can be applied to a video signal for use in a standard definition television (SDTV) by modifying matrix coefficients in equations 2 shown below.

The relationship between an RGB component signal (R, G, B) and a Y/color difference component signal (Y, Pb, Pr) for HDTV is prescribed by ITU709 as shown by the following equations 1 and 2:

$R = Y + a \times Pr,$ $G = Y - b \times Pb - c \times Pr,$ $B = Y + d \times Pb,$ (Equations 1)

$a = 1.5748,$ $b = 0.1873,$ $c = 0.4681,$ and $d = 1.8556.$ (Equations 2)

Because the Y scale in the actual digital transmission standard (SMPTEM274M) differs from the color difference (Pb or Pr) scale, it is necessary to multiply each color difference signal in equation 1 by a coefficient "438/448". However, the coefficient is omitted in this description of the principle.

If the upper limit value of the RGB component signal is S and the lower limit value of the RGB component signal is T, a gamut error in the RGB component signal is detected when one of conditions respectively shown by the following equations 3.1 to 3.6 is satisfied;

$R > S,$ (Equation 3.1)

$R < T,$ (Equation 3.2)

$G > S,$ (Equation 3.3)

$G < T,$ (Equation 3.4)

$B > S,$ and (Equation 3.5)

$B < T.$ (Equation 3.6)

Equations 3.1 to 3.6 are transformed by using equation 1 into the following equations 4.1 to 4.6;

$Y + a \times Pr > S,$ (Equation 4.1)

$Y + a \times Pr < T,$ (Equation 4.2)

$Y - b \times Pb - c \times Pr > S,$ (Equation 4.3)

$Y - b \times Pb - c \times Pr < T,$ (Equation 4.4)

$Y + d \times Pb > S,$ and (Equation 4.5)

$Y + d \times Pb < T.$ (Equation 4.6)

Equations 4.1 to 4.6 are further transformed into the following equations 5.1 to 5.6;

(With respect to the upper limit value)

$Y > S - a \times Pr,$ (R; equation 5.1)

$Y > S + b \times Pb + c \times Pr,$ (G; equation 5.3)

$Y > S - d \times Pb,$ (B; equation 5.5)

(With respect to the lower limit value)

$Y < T - a \times Pr,$ (R; equation 5.2)

$Y < T + b \times Pb + c \times Pr,$ and (G; equation 5.4)

$Y < T - d \times Pb.$ (B; equation 5.6)

By monitoring the original Y/color difference component signal on the basis of equations 5.1 to 5.6 (not by monitoring the converted RGB component signal), a gamut error in the RGB component signal is detected when one of conditions respectively shown by equations 5.1 to 5.6 is satisfied.

Embodiment of the Invention

An embodiment of the present invention will be described with reference to the accompanying drawings.

Figure 2A:
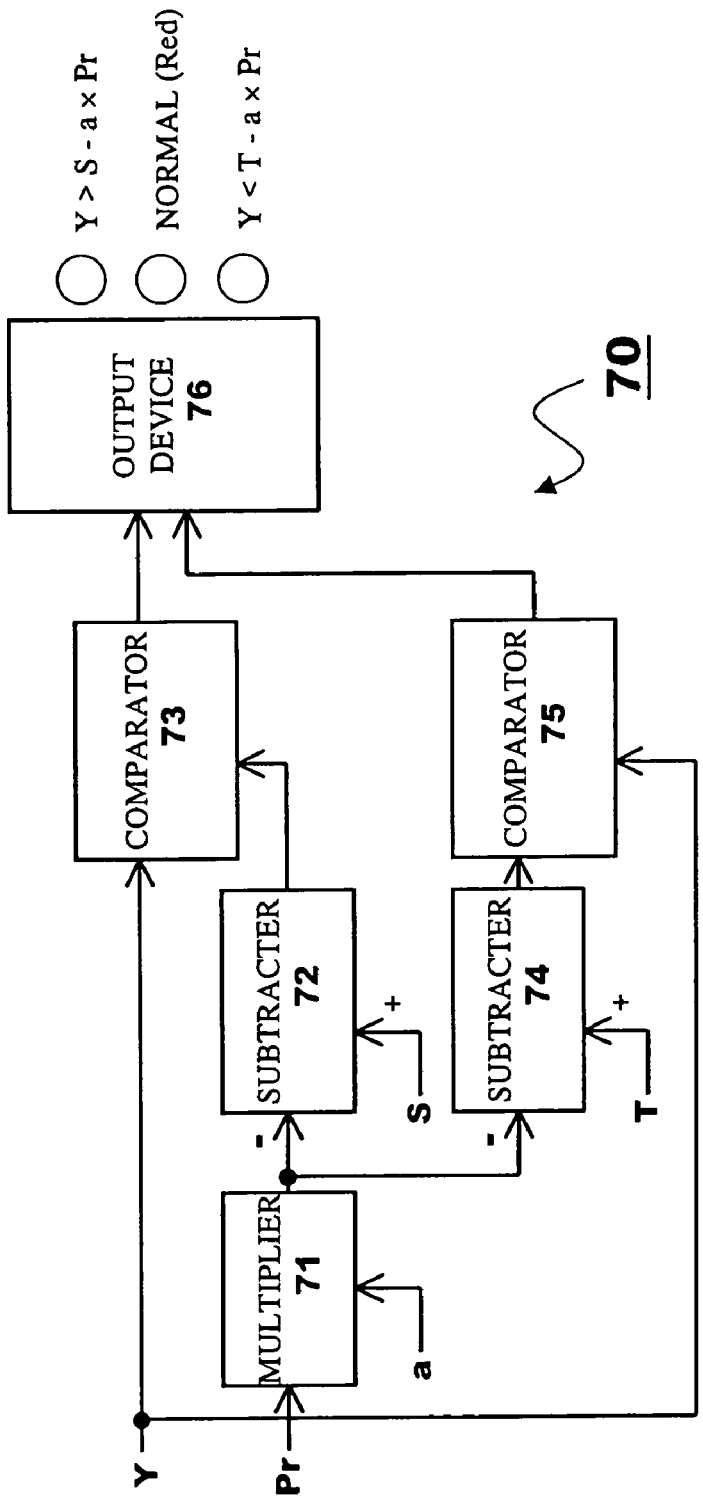
FIG. 2A is a block diagram of an arrangement for detecting a gamut error in the R component of a component signal.
Figure 2B:
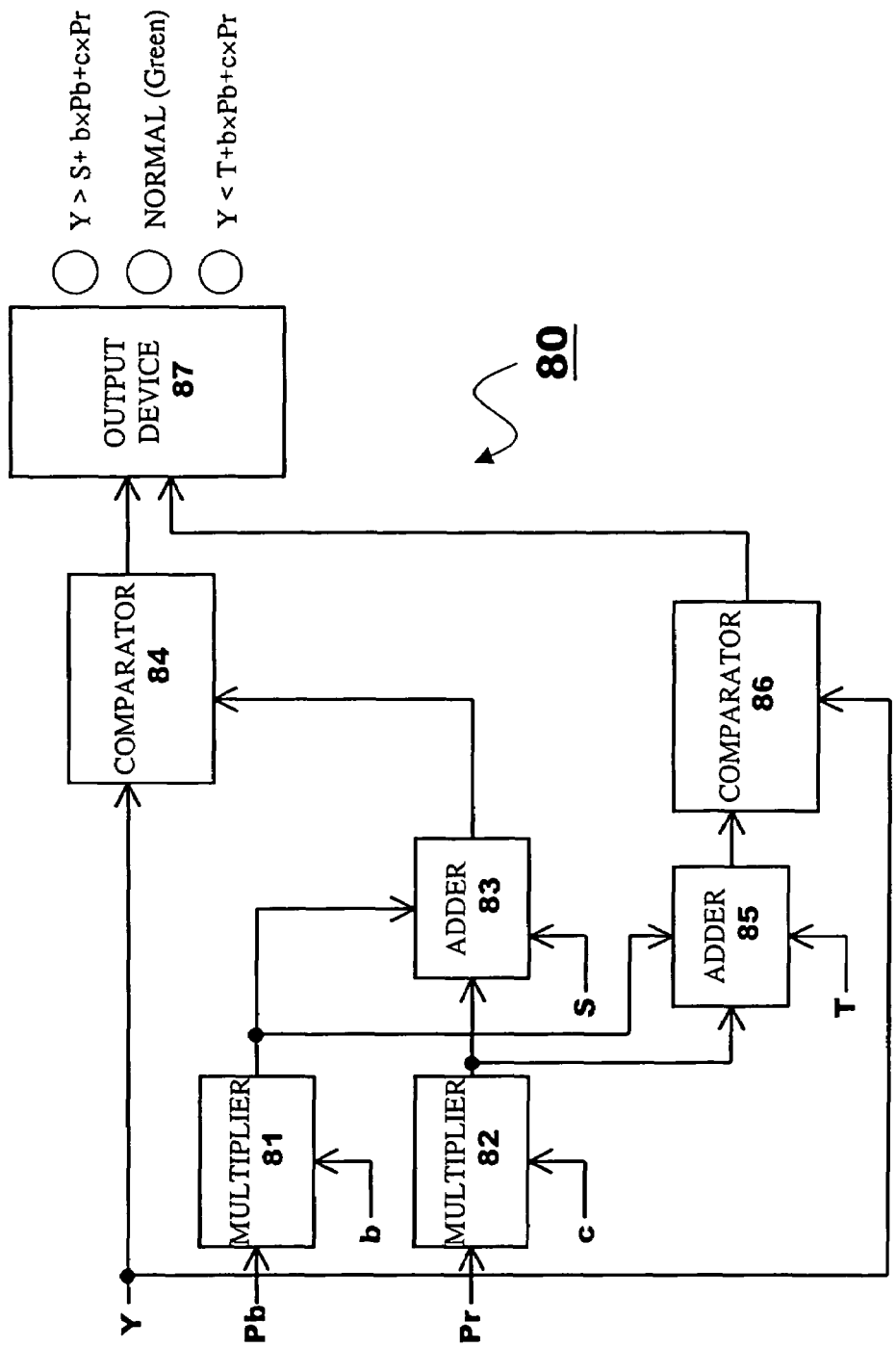
FIG. 2B is a block diagram of an arrangement for detecting a gamut error in the G component.
Figure 2C:
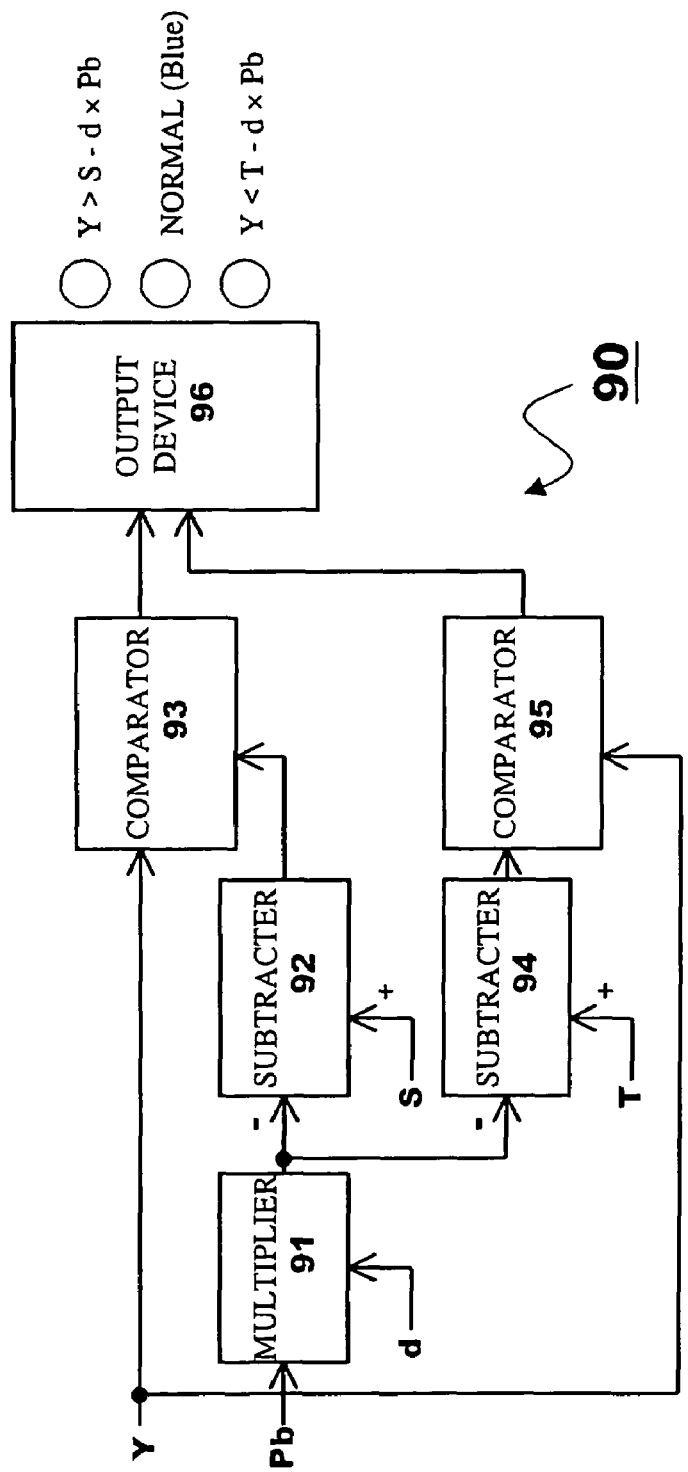
FIG. 2C is a block diagram of an arrangement for detecting a gamut error in the B component.

FIG. 2A is a block diagram of an arrangement for detecting a gamut error in the R component of a component signal, FIG. 2B is a block diagram of an arrangement for detecting a gamut error in the G component, and FIG. 2C is a block diagram of an arrangement for detecting a gamut error in the B component.

To detect a gamut error in the R component of an RGB component signal, the video signal monitoring apparatus of the present invention determines whether or not each of the conditions shown by equations 5.1 and 5.2 in the above is satisfied. As shown in FIG. 2A, means 70 for detecting a gamut error in the R component includes: a multiplier 71 to which the Pr component (first color difference component) of a Y/color difference component signal is input and which multiplies the Pr component by the first coefficient a in equation 2 and outputs an a×Pr component; a subtracter 72 to which the a×Pr component and the upper limit value S of the RGB component signal are input and which subtracts the a×Pr component from S and outputs an (S−a×Pr) component; a comparator 73 to which the Y component of the Y/color difference component signal and the (S−a×Pr) component are input, which compares the Y component and the (S−a×Pr) component to determine whether or not the Y component is larger than the (S−a×Pr) component, and which outputs a first comparison result indicating whether or not the condition shown by equation 5.1 in the above is satisfied; a subtracter 74 to which the a×Pr component and the lower limit value T of the RGB component signal are input and which subtracts the a×Pr component from T and outputs a (T−a×Pr) component; a comparator 75 to which the Y component of the Y/color difference component signal and the (T−a×Pr) component are input, which compares the Y component and the (T−a×Pr) component to determine whether or not the Y component is smaller than the (T−a×Pr) component, and which outputs a second comparison result indicating whether or not the condition shown by equation 5.2 in the above is satisfied; and an output device 76 to which the first and second comparison results are input, which makes visually recognizable a gamut error corresponding to the upper limit value S or the lower limit value T with respect to the R component if the condition shown by equation 5.1 or 5.2 is satisfied, and which makes visually recognizable a normal state with respect to the R component if the conditions shown by equations 5.1 and 5.2 are not satisfied.

To further detect a gamut error in the G component of the RGB component signal, the video signal monitoring apparatus of the present invention determines whether or not each of the conditions shown by equations 5.3 and 5.4 in the above is satisfied. As shown in FIG. 2B, means 80 for detecting a gamut error in the G component includes: a multiplier 81 to which the Pb component (second color difference component) of the Y/color difference component signal is input and which multiplies the Pb component by the second coefficient b in equation 2 and outputs a b×Pb component; a multiplier 82 to which the Pr component (first color difference component) of the Y/color difference component signal is input and which multiplies the Pr component by the third coefficient c in equation 2 and outputs a c×Pr component; an adder 83 to which the b×Pb component, the c×Pr component and the upper limit value S of the RGB component signal are input and which adds the b×Pb component and the c×Pr component to S and outputs an (S+b×Pb+c×Pr) component; a comparator 84 to which the Y component of the Y/color difference component signal and the (S+b×Pb+c×Pr) component are input, which compares the Y component and the (S+b×Pb+c×Pr) component to determine whether or not the Y component is larger than the (S+b×Pb+c×Pr) component, and which outputs a third comparison result indicating whether the condition shown by equation 5.3 in the above is satisfied; an adder 85 to which the b×Pb component, the c×Pr component and the lower limit value T of the RGB component signal are input and which adds the b×Pb component and the c×Pr component to T and outputs a (T+b×Pb+c×Pr) component; a comparator 86 to which the Y component of the Y/color difference component signal and the (T+b×Pb+c×Pr) component are input, which compares the Y component and the (T+b×Pb+c×Pr) component to determine whether or not the Y component is smaller than the (T+b×Pb+c×Pr) component, and which outputs a fourth comparison result indicating whether the condition shown by equation 5.4 in the above is satisfied; and an output device 87 to which the third and fourth comparison results are input, which makes visually recognizable a gamut error corresponding to the upper limit value S or the lower limit value T with respect to the G component if the condition shown by equation 5.3 or 5.4 is satisfied, and which makes visually recognizable a normal state with respect to the G component if the conditions shown by equations 5.3 and 5.4 are not satisfied.

To further detect a gamut error in the B component of the RGB component signal, the video signal monitoring apparatus of the present invention determines whether or not each of the conditions shown by equations 5.5 and 5.6 in the above is satisfied. As shown in FIG. 2C, means 90 for detecting a gamut error in the B component includes: a multiplier 91 to which the Pb component (second color difference component) of the Y/color difference component signal is input and which multiplies the Pb component by the fourth coefficient d in equation 2 and outputs a d×Pb component; a subtracter 92 to which the d×Pb component and the upper limit value S of the RGB component signal are input and which subtracts the d×Pb component from S and outputs an (S−d×Pb) component; a comparator 93 to which the Y component of the Y/color difference component signal and the (S−d×Pb) component are input, which compares the Y component and the (S−d×Pb) component to determine whether or not the Y component is larger than the (S−d×Pb) component, and which outputs a fifth comparison result indicating whether or not the condition shown by equation 5.5 in the above is satisfied; a subtracter 94 to which the d×Pb component and the lower limit value T of the RGB component signal are input and which subtracts the d×Pb component from T and outputs a (T−d×Pb) component; a comparator 95 to which the Y component of the Y/color difference component signal and the (T−d×Pb) component are input, which compares the Y component and the (T−d×Pb) component to determine whether or not the Y component is smaller than the (T−d×Pb) component, and which outputs a sixth comparison result indicating whether or not the condition shown by equation 5.6 in the above is satisfied; and an output device 96 to which the fifth and sixth comparison results are input, which makes visually recognizable a gamut error corresponding to the upper limit value S or the lower limit value T with respect to the B component if the condition shown by equation 5.5 or 5.6 is satisfied, and which makes visually recognizable a normal state with respect to the B component if the conditions shown by equations 5.5 and 5.6 are not satisfied.

Each of the output devices 76, 87, and 96 has, for example, first, second and third light emitting means. To indicate a gamut error corresponding to the upper limit value S, the output device makes the first light emitting means (e.g., a red light emitting diode (LED)) emit light. To indicate the normal state, the output device makes the second light emitting means (e.g., a green LED) emit light. To indicate a gamut error corresponding to the lower limit value T, the output device makes the third light emitting means (e.g., a red LED) emit light. Each of the output devices 76, 87, and 96 does not necessarily have the second light emitting means.

For example, when the first light emitting means of the output device 76 emits light, a user can understand that the condition shown by equation 5.1 (Y>S−a×Pr) is satisfied. Therefore, the user can easily adjust the Y component so that the Y component becomes smaller, or can easily adjust the Pr component so that the Pr component becomes larger.

Each of the output devices 76, 87, and 96 may have one light emitting means adapted for indication of each of the upper limit value S, the normal state and the lower limit value T. That is, each of the output devices 76, 87, and 96 makes the light emitting means in a first cycle in the case of indicating a gamut error corresponding to the upper limit value S, makes the light emitting means stop emitting light in the case of indicating the normal state, and makes the light emitting means emit light in a second cycle in the case of indicating a gamut error corresponding to the lower limit value T (for example, the period of the second cycle> the period of the first cycle).

Figure 3:
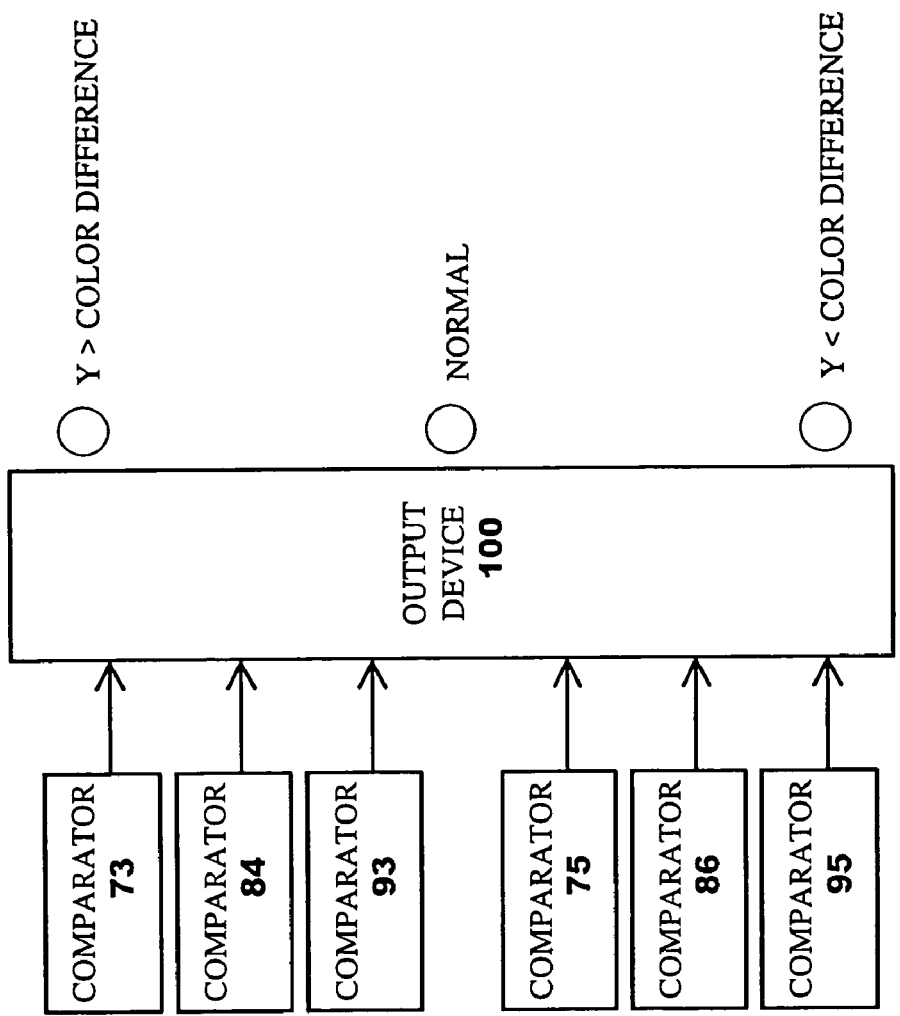
FIG. 3 is a diagram showing an output device 100 which is a modification of output devices 76, 87, and 96 shown in FIGS. 2A, 2B, and 2C.

FIG. 3 shows an example of modification of the output devices 76, 87, and 96 shown in FIGS. 2A, 2B, and 2C. As shown in FIG. 3, an output device 100 is supplied with the first, third and fifth comparison results from the comparators 73, 84, and 93 and makes visually recognizable a gamut error corresponding to the upper limit value S with respect to the RGB component signal when the condition shown by equation 5.1, 5.3 or 5.5 in the above is satisfied. The output device 100 is also supplied with the second, fourth and sixth comparison results from the comparators 75, 86, and 95 and makes visually recognizable a gamut error corresponding to the lower limit value T with respect to the RGB component signal when the condition shown by equation 5.2, 5.4 or 5.6 in the above is satisfied. The output device 100 makes the normal state visually recognizable with respect to the RGB component signal when none of the conditions shown by equations 5.1, 5.2, 5.3, 5.4, 5.5, and 5.6 is satisfied. It is not necessarily required that the output device 100 make the normal state visually recognizable.

For example, when the output device 100 indicates a gamut error corresponding to the upper limit value S, the user can understand that the condition shown by equation 5.1, 5.3 or 5.5 (Y>S−a×Pr, Y>S+b×Pb+c×Pr, or Y>S−d×Pb) is satisfied. Therefore, the user can easily adjust the Y component so that the Y component becomes smaller.

It should be understood that the video signal monitoring apparatus according to the present invention is not limited to the illustrated example described above, but may be modified in various manners without departing from the spirit of the invention.

What is claimed is:

1. An apparatus for monitoring a video signal, comprising:
   means for inputting a Y/color difference component signal (Y, Pr, Pb);
   means for setting upper limit values S and lower limit values T corresponding to all components of an RGB component signal (R, G, B);
   means for determination as to the existence of a gamut error, said determination means making determination as to whether at least one of
      a first condition Y>S+α×Pb+β×Pr (where each of α and β is a predetermined coefficient) indicating that at least one of R, G and B components is larger than the upper limit value S and
      a second condition Y<T+γ×Pb+δ×Pr (where each of γ and δ is a predetermined coefficient) indicating that at least one of the R, G and B components is smaller than the lower limit value T
   is satisfied; and
   means for making a gamut error state visually recognizable when the first condition or the second condition is satisfied.

2. An apparatus for monitoring a video signal, comprising means for detecting a gamut error in an R component, means for detecting a gamut error in a G component, and means for detecting a gamut error in a B component,
   said means for detecting a gamut error in the R component including:
      means for generating a first condition Y>S−a×Pr (where a is a predetermined coefficient) and a second condition Y<T−a×Pr from a Pr component (first color difference component) of a Y/color difference component signal and an upper limit value S and a lower limit value T of the RGB component signal; and
      means for making a gamut error state visually recognizable with respect to the R component when the first condition or the second condition is satisfied,
   said means for detecting a gamut error in the G component including:
      means for generating a third condition Y>S+b×Pb+c×Pr (where each of b and c is a predetermined coefficient) and a fourth condition Y<T+b×Pb+c×Pr from the Pr component and a Pb component (second color difference component) of the Y/color difference component signal and the upper limit value S and the lower limit value T of the RGB component signal; and
      means for making a gamut error state visually recognizable with respect to the G component when the third condition or the fourth condition is satisfied,
   said means for detecting a gamut error in the B component including:
      means for generating a fifth condition Y>S−d×Pr (where d is a predetermined coefficient) and a sixth condition Y<T−d×Pr from the Pb component of the Y/color difference component signal and the upper limit value S and the lower limit value T of the RGB component signal; and
      means for making a gamut error state visually recognizable with respect to the B component when the fifth condition or the sixth condition is satisfied.

* * * * *